US009928486B2

(12) United States Patent
Dietz (10) Patent No.: US 9,928,486 B2
(45) Date of Patent: Mar. 27, 2018

(54) METHOD AND SYSTEM FOR SELECTIVELY DISPLAYING CALENDAR INFORMATION ON SECURE CALENDAR

(71) Applicant: OpenPeak LLC, Plano, TX (US)

(72) Inventor: Carsten Michael Dietz, Boynton Beach, FL (US)

(73) Assignee: OpenPeak LLC, Plano, TX (US)

( * ) Notice: Subject to any disclaimer, the term of this patent is extended or adjusted under 35 U.S.C. 154(b) by 341 days.

(21) Appl. No.: 14/730,553

(22) Filed: Jun. 4, 2015

(65) Prior Publication Data

US 2015/0379475 A1 Dec. 31, 2015

Related U.S. Application Data

(60) Provisional application No. 62/008,294, filed on Jun. 5, 2014.

(51) Int. Cl.
| | |
|---|---|
| *G06F 3/048* | (2013.01) |
| *G06Q 10/10* | (2012.01) |
| *G06F 3/0481* | (2013.01) |
| *H04L 12/24* | (2006.01) |

(52) U.S. Cl.
CPC ..... *G06Q 10/1093* (2013.01); *G06F 3/04817* (2013.01); *H04L 41/028* (2013.01)

(58) Field of Classification Search
CPC ...... G06Q 10/06; G06Q 10/10; G06Q 10/109; G06Q 50/01
See application file for complete search history.

(56) References Cited

U.S. PATENT DOCUMENTS

| | | | |
|---|---|---|---|
| 5,790,974 A * | 8/1998 | Tognazzini | G01C 21/343 340/988 |
| 8,261,064 B2 | 9/2012 | Ditzman et al. | |
| 2004/0127190 A1 | 7/2004 | Hasson et al. | |
| 2007/0118874 A1 | 5/2007 | Adams et al. | |
| 2011/0135091 A1 | 6/2011 | Radatti | |
| 2012/0005764 A1 | 1/2012 | MacKay et al. | |
| 2013/0091543 A1 | 4/2013 | Wade et al. | |
| 2014/0096230 A1 | 4/2014 | Wade | |
| 2014/0148120 A1 | 5/2014 | Buck | |
| 2014/0282828 A1* | 9/2014 | Stuntebeck | G06F 21/62 726/1 |

(Continued)

OTHER PUBLICATIONS

U.S. Appl. No. 61/973,898, filed Apr. 2, 2014, 27 pages.

(Continued)

*Primary Examiner* — Claudia Dragoescu (57) ABSTRACT

A method and system for selectively displaying calendar information on a secure calendar application in an environment designed to restrict secure applications from processing requests from non-secure applications are described herein. In particular, calendar information can be selectively accessed from a non-secure calendar application in accordance with a sync setting that is enforceable against the calendar information. The calendar information from the non-secure calendar application can be imported into a secure calendar application. In addition, the imported calendar information can be displayed as part of the user interface of the secure calendar application when the secure calendar application is activated.

16 Claims, 6 Drawing Sheets

(56) References Cited

U.S. PATENT DOCUMENTS

2014/0325679 A1* 10/2014 Heo .................. G06F 21/606
  726/28
2014/0359793 A1 12/2014 Dobson et al.
2015/0341362 A1 11/2015 Dobson et al.

OTHER PUBLICATIONS

U.S. Appl. No. 61/008,294, filed Jun. 5, 2014, 31 pages.
Non-final Office Action for U.S. Appl. No. 14/291,905, dated Jul. 29, 2015, 22 pages.
Amendment and Reply for U.S. Appl. No. 14/291,905, filed Aug. 5, 2015, 9 pages.

* cited by examiner

“METHOD AND SYSTEM FOR SELECTIVELY DISPLAYING CALENDAR INFORMATION ON SECURE CALENDAR

CROSS-REFERENCE TO RELATED APPLICATIONS

This patent application claims priority to U.S. Patent Provisional Application No. 62/008,294, filed on Jun. 5, 2014, which is incorporated herein by reference in its entirety.

FIELD OF TECHNOLOGY

The present description relates to methods and systems for enabling communications between applications and more particularly, enabling the selective importation of data into a secure calendar.

BACKGROUND

In an effort to increase productivity, many employers allow their workers to conduct business related to the employer on their personal mobile devices. In some cases, employers also provide some of their employees with company-issued mobile devices. In either arrangement, an employer understands that a single device may include sensitive data related to that employer in addition to data that is personal to the employee. Several advances have been made in an effort to protect an employer's data in these circumstances. For example, OpenPeak Inc. of Boca Raton, Fla. has developed solutions that enable a mobile device to include both enterprise and personal data but that isolate the enterprise data from the personal data. As part of these solutions, an employee may download secure applications that may be used to conduct transactions related to the enterprise, but these secure applications may be prevented from exchanging data with conventional or non-secure applications.

These secure applications have typically been altered to enable management of the applications and for security purposes, a process sometimes referred to as "wrapping" or "adapting" the application. In certain cases, an application is wrapped by manipulating the binary of the application and inserting adaptive code in the application to enable the interception of calls to and from the application. This process can increase the functionality of the application and can make it secure, as described above.

In some cases, the secure applications may be designated for inclusion in a secure partition. Steps can be taken to encapsulate the internal communications of the secure applications in the secure partition, such as by creating an unpredictable namespace for these communications. Through namespace enforcement, a non-secure application is prevented from accessing data from or communicating with a secure application, even if the non-secure application is the same version as the secure application. Thus, there is a concerted effort to minimize the exposure of enterprise data to any non-secure programs of the user's mobile device. Even so, a sensitive balance must be reached to maximize the efficiency of the user's time and availability and the productivity of the secure applications on the mobile device.

SUMMARY

A method of selectively displaying calendar information on a secure calendar application is described herein. The method can be performed in an environment designed to restrict secure applications from processing requests from non-secure applications. In particular, calendar information can be selectively accessed or retrieved from a non-secure calendar application in accordance with a sync setting that is enforceable against the calendar information. The calendar information can be imported from the non-secure calendar application into a secure calendar application. In addition, the imported calendar information can be displayed as part of the user interface of the secure calendar application when the secure calendar application is activated. As an example, the imported calendar information can be calendar information that shows details related to a personal schedule of a user. This process and any of the other solutions presented herein may apply to any type of enterprise application and its interactions with other enterprise applications or personal applications.

In one arrangement, the imported calendar information can be displayed in addition to enterprise calendar information that is organic to the secure calendar application. In another embodiment, selectively accessing the calendar may include accessing all fields of the calendar information for a particular event from the non-secure application such that all fields of the calendar information are imported and displayed as part of the secure calendar application. Alternatively, selectively accessing the calendar may include accessing only certain fields of the calendar information for a particular event from the non-secure application such that only the certain fields of the calendar information are imported and displayed as part of the secure calendar application. For example, the certain fields are a date field and a time field.

In some cases, the imported calendar information can be edited when the imported calendar information is displayed as part of the secure calendar application. In other cases, the imported calendar information may not be edited when the imported calendar information is displayed as part of the secure calendar application. When editing is disallowed, an indication that edits to the imported calendar information are required to be performed through the non-secure calendar application may be provided. Further, the imported calendar information can be incorporated into a scheduling assistant that provides an indication as to the availability of a user for a particular time slot.

A method of selectively displaying information from a first non-secure application as part of a first secure application is also described herein. This method may also be practiced in an environment designed to restrict secure applications from processing requests from non-secure applications. Specifically, data can be retrieved from the first non-secure application in which the data is personal data that is associated with a user of the first non-secure application. The retrieved data can be displayed as part of the first secure application on a restricted basis such that some part of the personal data of the user is displayed as part of the first secure application and some part of the personal data is prevented from being displayed as part of the first secure application. As an example, personal data may be data that is related to the personal lifestyle of a user of a computing device and is distinct from data that is associated with an enterprise or work or volunteer organization with which the user is associated.

The first secure application may correspond to the non-secure application such that the first secure application is a secure version of the first non-secure application. As an example, the first secure application can be a secure calendar application, and the first non-secure application can be a non-secure calendar application. The part of the personal data that is displayed as part of the first secure application may relate to temporal information from an event that is scheduled in the non-secure calendar application. Also, the part of the personal data that is prevented from being displayed as part of the first secure application may relate to information that describes the event (other than simple temporal information) that is scheduled in the non-secure calendar application.

A computing device that supports an environment designed to restrict secure applications from processing requests from non-secure applications is also described herein. The computing device can include a display unit that is configured to display the secure applications and the non-secure applications. As an example, one of the secure applications is a secure calendar application, and one of the non-secure applications is a non-secure calendar application. The computing device can also include a processing unit that is configured to facilitate the selective retrieval of calendar information from the non-secure calendar application and facilitate the importation of the retrieved calendar information from the non-secure calendar application into the secure calendar application. The processing unit can also be configured to cause the display unit to display the imported calendar information as part of the secure calendar application when the secure calendar application is activated.

The processing unit can be further configured to facilitate user selections to enable the selective retrieval and importation of the calendar information from the non-secure calendar application. In another arrangement, the processing unit can be configured to cause the display unit to display the imported calendar information in addition to calendar information that is organic to the secure calendar application. As an example, the retrieved calendar information only includes information relating to the time and date of an event. The processing unit can be further configured to cause the display unit to display a scheduling assistant. As an example, the scheduling assistant can provide the availability of a user of the computing device based at least in part on the imported calendar information from the non-secure calendar application. The processing unit can be further configured to cause the display unit to selectively display an indication that a user of the computing device is disallowed from editing the imported calendar information.

Further features and advantage, as well as the structure and operation of various embodiments, are described in detail below with reference to the accompanying drawings. It is noted that this description is not limited to the specific embodiments presented herein. Such embodiments are provided for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the subject matter described herein and, together with the description, further serve to explain the principles of such subject matter and to enable a person skilled in the relevant art(s) to make and use the subject matter.

Applicants expressly disclaim any rights to any third-party trademarks or copyrighted images included in the figures. Such marks and images have been included for illustrative purposes only and constitute the sole property of their respective owners.

The features and advantages of the embodiments herein will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

The following detailed description refers to the accompanying drawings that illustrate exemplary embodiments; however, the scope of the present claims is not limited to these embodiments. Thus, embodiments beyond those shown in the accompanying drawings, such as modified versions of the illustrated embodiments, may nevertheless be encompassed by the present claims.

References in the specification to "one embodiment," "an embodiment," "an example embodiment," "one arrangement," "an arrangement" or the like, indicate that the embodiment or arrangement described may include a particular feature, structure, or characteristic, but every embodiment may not necessarily include the particular feature, structure, or characteristic. Moreover, such phrases are not necessarily referring to the same embodiment or arrangement. Furthermore, when a particular feature, structure, or characteristic is described in connection with an embodiment or arrangement, it is submitted that it is within the knowledge of one skilled in the art to implement such feature, structure, or characteristic in connection with other embodiments or arrangements whether or not explicitly described. The word "among," as it is used throughout this description, should not necessarily be interpreted as requiring exchanges or interaction among three or more applications, irrespective of grammar rules. The word "a" is not necessarily limited to a singular instance of something, as it may mean one or more.

Several definitions that apply throughout this document will now be presented. The term "exemplary" as used herein is defined as an example or an instance of an object, apparatus, system, entity, composition, method, step or process. The term "communicatively coupled" is defined as a state in which two or more components are connected such that communication signals are able to be exchanged (directly or indirectly) between the components on a unidirectional or bidirectional (or multi-directional) manner, either wirelessly, through a wired connection or a combination of both. A "computing device" is defined as a component that is configured to perform some process or function for a user and includes both mobile and non-mobile devices. The term "computer readable storage medium" is defined as one or more components that are configured to store instructions that are to be executed by one or more processing units.

An "application" is defined as a program or programs that perform one or more particular tasks on a computing device. Examples of an application include programs that may present a user interface for interaction with a user or that may run in the background of an operating environment that may not present a user interface while in the background. The term "operating system" is defined as a collection of software components that directs a computing device's operations, including controlling and scheduling the execution of other programs and managing storage, input/output and communication resources. A "processing unit" or "processor" is defined as one or more components that execute sets of instructions, and the components may be disparate parts or part of a whole unit and may not necessarily be located in the same physical location. The term "facilitate" is defined as to assist, to support, to guide, to control, to manage, or to further along a process, method or algorithm in some way.

The terms "memory," "memory element" or "repository" are defined as one or more components that are configured to store data, either on a temporary or persistent basis. The term "shared memory" is memory, a memory element or a repository that is accessible (directly or indirectly) by two or more applications or other processes. An "interface" is defined as a component or a group of components that enable(s) a device to communicate with one or more different devices, whether through hard-wired connections, wireless connections or a combination of both. An "input device" is defined as a device that is configured to receive input from a user or a machine that is intended to cause some action or other effect on a component with which the input device is associated.

The term "file system" is defined as an abstraction that is used to organize, store and retrieve data. The term "secure application" is defined as an application that has been modified or enhanced from its original form to restrict communications between the application and unauthorized programs, applications or devices and to restrict operation of the application based on policy or to alter, augment or add features associated with the operation of the application (or any combination thereof) or—in the case of the application not being modified—an application that is part of a secure workspace that is protected from data exchanges with applications that are part of a personal or an unsecure workspace. An "enterprise application" is defined as an application that is associated with an enterprise such that a user interacting with the application is performing an operation of behalf of the enterprise during at least some part of the time during the interaction, though not necessarily for each interaction. A "target application" is defined as an application that has been selected for conversion into a secure application. An "unsecure application" is defined as an application that has not undergone the modification required to convert the application into a secure application and, as such, is unable to obtain data from a secure application in view of an obfuscation scheme employed by that secure application or is an application that is not part of a secure workspace and is restricted from accessing data from the secure workspace. The term "secure framework" is defined as a framework that is configured to encapsulate a secure application by at least preventing the secure application from processing requests from a non-secure application. A "virtual machine" is defined as a platform-independent execution environment that emulates a physical machine.

The term "personal workspace" is defined as a workspace, profile or partition that is configured to contain the personal content and non-secure applications or other non-secure programs associated with a user of a computing device on which the personal workspace sits. The term "secure workspace" is defined as a workspace, profile or partition that is configured to contain secure content, secure applications and other secure programs and requires some form of authentication to be accessed.

The term "calendar information" is defined as information that relates to a schedule of one or more individuals or groups of individuals or the progress of a task over the course of some amount of time. The word "activate" is defined as starting, launching, executing or otherwise causing the operation of some object. The term "import" or "importing" is defined as a process or act in which one or more objects are brought, transferred or moved into or to a recipient for use at least by that recipient.

As explained earlier, solutions have been developed to enable employees of an enterprise to carry mobile devices that include both enterprise and personal data, with the enterprise data being isolated from the personal data. As part of these solutions, one or more secure applications may be installed on an employee's mobile device that also includes one or more non-secure applications. To protect the enterprise data, such an arrangement prevents the secure applications from processing the requests from non-secure applications in a blanket and indiscriminate fashion. Even so, a sensitive balance should be reached to permit secure applications to process some data from non-secure applications, with protections for the user's personal information, to maximize the efficiency of the overall environment in which the applications operate.

A method and system that present solutions for this issue are described herein. As an example, the system may support an environment that is designed to restrict secure applications from processing requests from non-secure applications, and the method may be practiced in such a setting. The term "restrict," as used in this context, is defined as a complete bar for secure applications to process requests from non-secure applications, unless such a request is approved via a secure framework or some other oversight object or component or via some process.

In one arrangement, calendar information can be selectively accessed from a non-secure calendar application in accordance with a sync setting that is enforceable against the calendar information. The calendar information from the non-secure calendar application can be imported into a secure calendar application. In addition, the imported calendar information can be displayed as part of the user interface of the secure calendar application when the secure calendar application is activated.

Through this process, personal events from a non-secure calendar application can be integrated into a secure calendar application. At the same time, however, steps can be taken to ensure sensitive personal data is not revealed through the secure calendar application. Accordingly, a user's full agenda may be taken into account when determining an appropriate time to schedule a particular event, while protecting that user's privacy.

Figure 1:
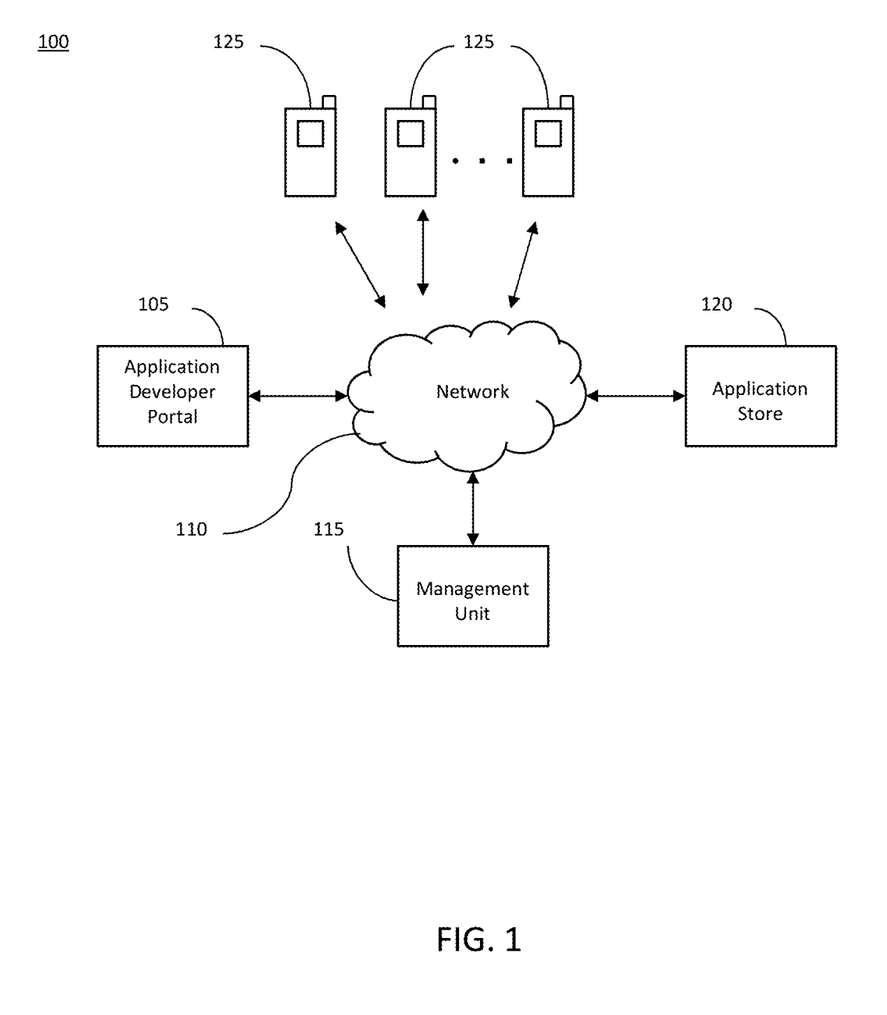
FIG. 1 illustrates an example of a system for the distribution of applications to computing devices.

Referring to FIG. 1, a system 100 that is useful for distributing applications is shown. In one arrangement, the system 100 can include an application developer portal 105, a network 110, a management unit 115, an application store or repository 120 and any number of computing devices 125. Although not shown here, the system 100 can include multiple application developer portals 105, networks 110, management units 115 or application stores 120. Also, while FIG. 1 implies that the computing device 125 is a mobile unit, the system 100 and the processes described herein may be relevant to and practiced with fixed computing devices.

The application developer portal 105 can present an interface that enables developers of applications to upload their applications for eventual publication in the application store 120. The application store 120, as is known in the art, can enable users of the portable computing devices 125 to install such published applications on their devices 125. In some cases, the applications from the application developers may be directed to the management unit 115 prior to being published in the application store 120. Through the management unit 115, the applications may be modified such that they are more conducive for operation on behalf of an enterprise or other organization. For example, the applications may be converted into secure applications, a process in which certain intercepts may be imposed on an application such that functions of the application may be restricted, enhanced or otherwise modified in some way, depending on input from the enterprise. Examples of this process are known in the art, and additional information may be obtained from U.S. Pat. No. 8,695,060, issued on Apr. 8, 2014, and U.S. patent application Ser. No. 14/036,415, filed on Sep. 25, 2013, each of which is herein incorporated by reference in its entirety. An application that has been selected for conversion into a secure application by the management unit 115 (or some other component) may be referred to as a target application. In addition, an application that has not undergone the process of conversion into a secure application may be referred to as a non-secure application.

Once a secure application is generated, it can be published in the application store 120, similar to a conventional application that has been published. Because the application store 120 accepts and offers secure applications, it may also be referred to as a secure application store 120. In some cases, the secure application store 120 may be configured to accept and offer only secure applications, although in other scenarios it may accept and offer both secure and non-secure applications. In addition, the secure application store 120 may have limited access to a certain group of users, such as those associated with a particular enterprise, or it may be open to the general public. If access is limited to the secure application store 120, an accessing user may be required to provide some form of authentication before being granted such access. Moreover, the applications that are made available through the secure application store 120 are not necessarily required to be received from the application developer portal 105, as other sources may be used to provide applications to the secure application store 120.

The network 110 can facilitate communications between any of the components of the system 100. As mentioned earlier, there may be multiple networks 110 in the system 100, and each network 110 may be composed of various types of components to support wireless or wired communications (including both). In addition, the network(s) 110 may be configured to support both local or wide area communications (or both).

In one arrangement, the management unit 115 may serve as a remote portal that can be used to manage certain features or operations of the computing devices 125. For example, as will be explained in more detail below, the management unit 115 can provide information to the computing devices 125 to enable the secure applications on a computing device 125 to process requests from non-secure applications.

Figure 2:
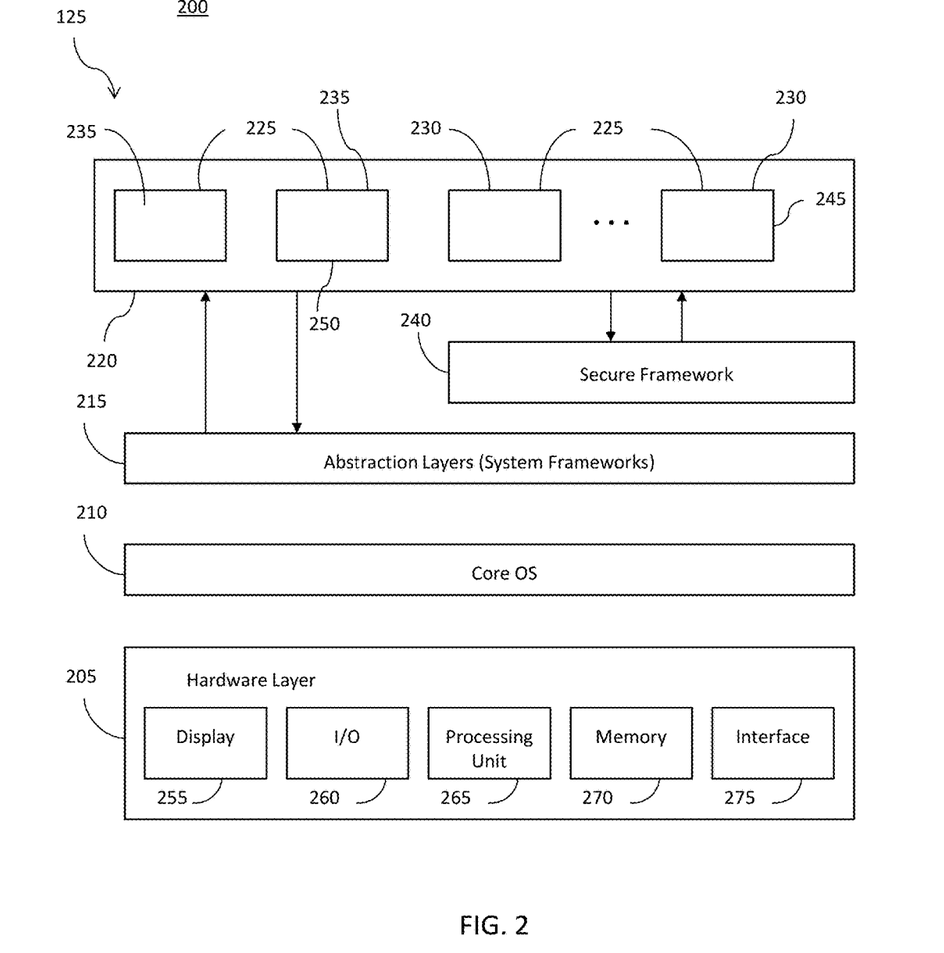
FIG. 2 illustrates an example of a block diagram of the system architecture of a computing device.

Referring to FIG. 2, an example of a block diagram 200 of the system architecture of a computing device 125 is shown. In this arrangement, the computing device 125 can include a hardware layer 205, a core operating system (OS) layer 210 and additional abstraction layers 215, which may include any number of system frameworks. This architecture may also include an application layer 220, which may include a plurality of applications 225. In one arrangement, some of the applications 225 may be secure applications 230, and some of the applications 225 may be non-secure applications 235. In addition, a secure framework 240 may be part of the architecture. Through the selective imposition of secure namespacing when a target application is wrapped, the secure applications 230 may be configured to call the secure framework 240 for certain requests. In addition, this arrangement may prevent the secure applications 230 from processing any requests from the non-secure applications 235, although the secure framework 240 may be configured to permit certain predefined requests from the non-secure applications 235 to be handled by the secure applications 230. For additional information on this concept, please refer to U.S. Provisional Patent Application No. 61/973,898, filed on Apr. 2, 2014, which is herein incorporated by reference.

In some cases, the secure applications 230 may be permitted to call one or more of the system frameworks of the abstraction layers 215. For example, during the wrapping process, certain calls to the conventional frameworks of the OS may remain unmodified, which can permit the secure applications 230 to obtain data from one or more of the non-secure applications 235.

As an example, one of the secure applications 230 may be a secure calendar application 245. The secure calendar application 245 may be configured to permit a user to schedule events, or generate reminders for such events, that are related to an enterprise with which the user is associated. For example, the user's employer may provide a secure calendar application 245 that enables the user to schedule meetings with other co-workers and to view the calendar entries for the other co-workers. In addition, another user may perform such tasks on behalf of the user. In either event, the data that may be associated with the secure calendar application 245 may be confidential, and as such, the secure calendar application 245 may be configured to avoid sharing it with unauthorized programs or applications. As an example, the secure calendar application 245 may only be permitted to share its data with other secure applications 230 or with only secure applications 230 that have some related to the secure calendar application 230, such as through a certificate signed by the same entity.

As another example, the secure calendar application 245 may be part of a secure personal information manager (PIM) application. In one arrangement, the secure PIM application may be comprised of one or more other secure applications 230, each of which may be related to certain types of core secure data, like secure contacts, secure calendars and secure tasks. Of course, the secure calendar application 245 may be a stand-alone application, if so desired.

Because the computing device 125 also may include non-secure applications 235, a non-secure calendar application 250 may be installed on the device 125. In one embodiment, calendar information may be retrieved from the non-secure calendar application 250 and imported to the secure calendar application 245. This feature can enable the secure calendar application 245 to have a more accurate indication as to schedule and the availability of a user of the computing device 125. As such, the secure calendar application 245 can register to receive events and other relevant information from the non-secure calendar application 250 or some other suitable non-secure application 235. Additional information on this feature will be presented below.

As an example, the secure calendar application 245 can correspond to the non-secure calendar application 250 such that the secure calendar application 245 is a secure version of the non-secure calendar application 250. For example, a vendor may provide a non-secure calendar application 235, and this application 235 may be wrapped to create a corresponding secure calendar application 230. Of course, such a correspondence is not necessary to carry out the procedures described herein.

In one arrangement, the hardware layer 205 may include any number and type of hardware components, such as one or more displays 255, one or more input/output (I/O) devices 260, one or more processing units 265 and any suitable type and number of memory devices 270 and interfaces 275. Examples of I/O devices include speakers, microphones, physical keypads, etc. The interfaces 275 can be configured to support various types of communications, including wired or wireless and through any suitable type of standards and protocols. Any one or more of the memory devices 270 can be a non-transitory memory element that is used to store instructions for causing a device to perform the processes described herein.

Although not shown here, a virtual partition may be created on the computing device 125 in which the secure applications 230 (and the secure calendar application 245) are part of a secure workspace, and the non-secure applications 235 (and the non-secure calendar application 250) are part of a personal workspace. In certain cases, a user may be required to provide authentication information, such as a password, PIN or biometric data, to gain access to the secure workspace or to any individual or group of secure applications 230. That is, any user who wishes to have access to a secure application 230 or the data that is part of the secure application 230 may be required to provide authentication information before being allowed such access. In addition, the user may launch both secure applications 230 and non-secure applications 235 through an I/O device 260.

Figure 3:
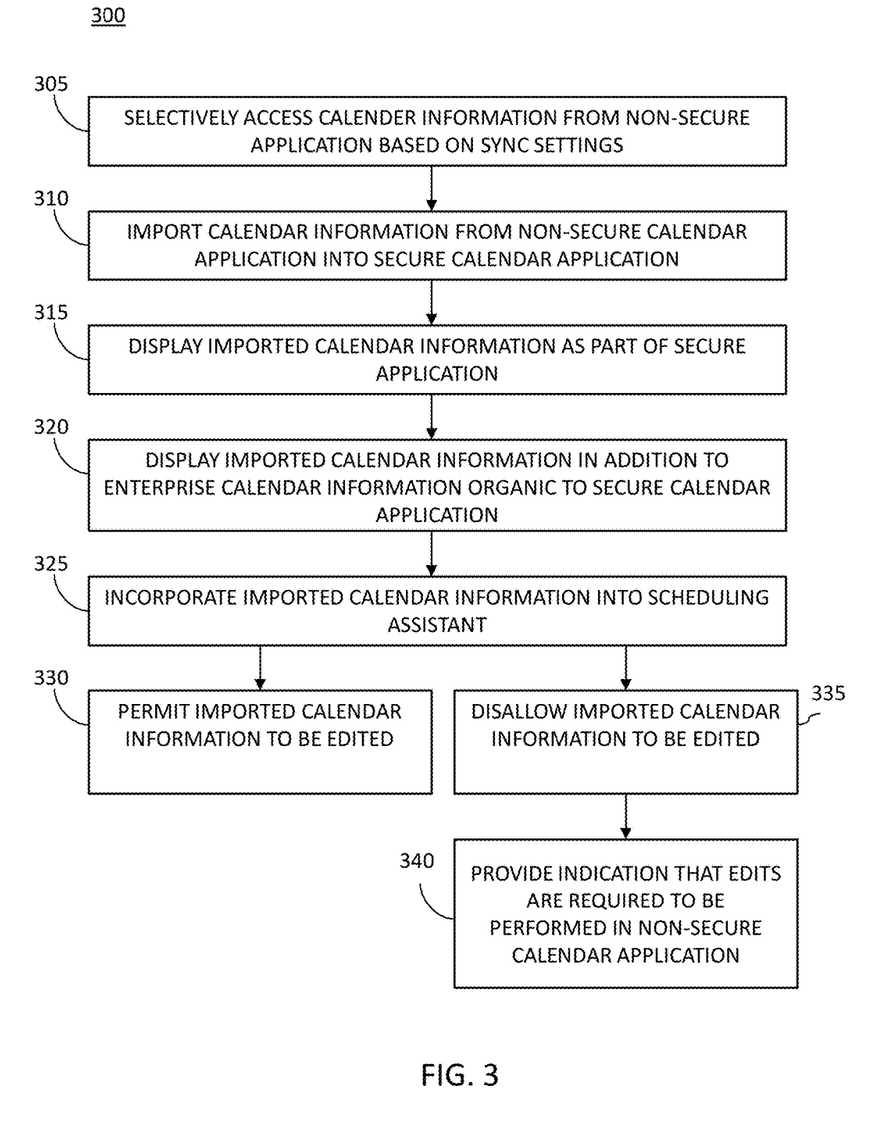
FIG. 3 illustrates an example of a method for selectively displaying calendar information on a secure calendar application.

Referring to FIG. 3, an exemplary method 300 for selectively displaying calendar information on a secure calendar application is shown. The method 300, however, may include additional or even fewer steps or processes in comparison to what is illustrated in FIG. 3. Moreover, the method 300 is not necessarily limited to the chronological order that is shown in FIG. 3. In describing the method 300, reference may be made to FIGS. 1, 2 and 4-6, although it is understood that the method 300 may be practiced with any other suitable systems and components and may take advantage of other suitable processes.

At step 305, calendar information can be selectively accessed from a non-secure calendar application in accordance with a sync setting that is enforceable against the calendar information. At step 310, the calendar information can be imported from the non-secure calendar application into a secure calendar application. The imported calendar information can be displayed as part of the user interface of the secure calendar application when the secure calendar application is activated, as shown at step 315. In addition, at step 320, the imported calendar information can be displayed in addition to enterprise calendar information that is organic to the secure calendar application.

At step 325, the imported calendar information can be incorporated into a scheduling assistant that provides an indication as to the availability of a user for a particular time slot. The act of editing the imported calendar information may be permitted when it is displayed as part of the secure calendar application, as shown at step 330. Alternatively, the act of editing the imported calendar information may be disallowed when the calendar information is displayed as part of the secure calendar application, as shown at step 335. In this case, an indication can be provided that edits to the imported calendar information are required to be performed though a non-secure calendar application, as shown at step 340. Examples of these steps will now be presented.

Figure 4:
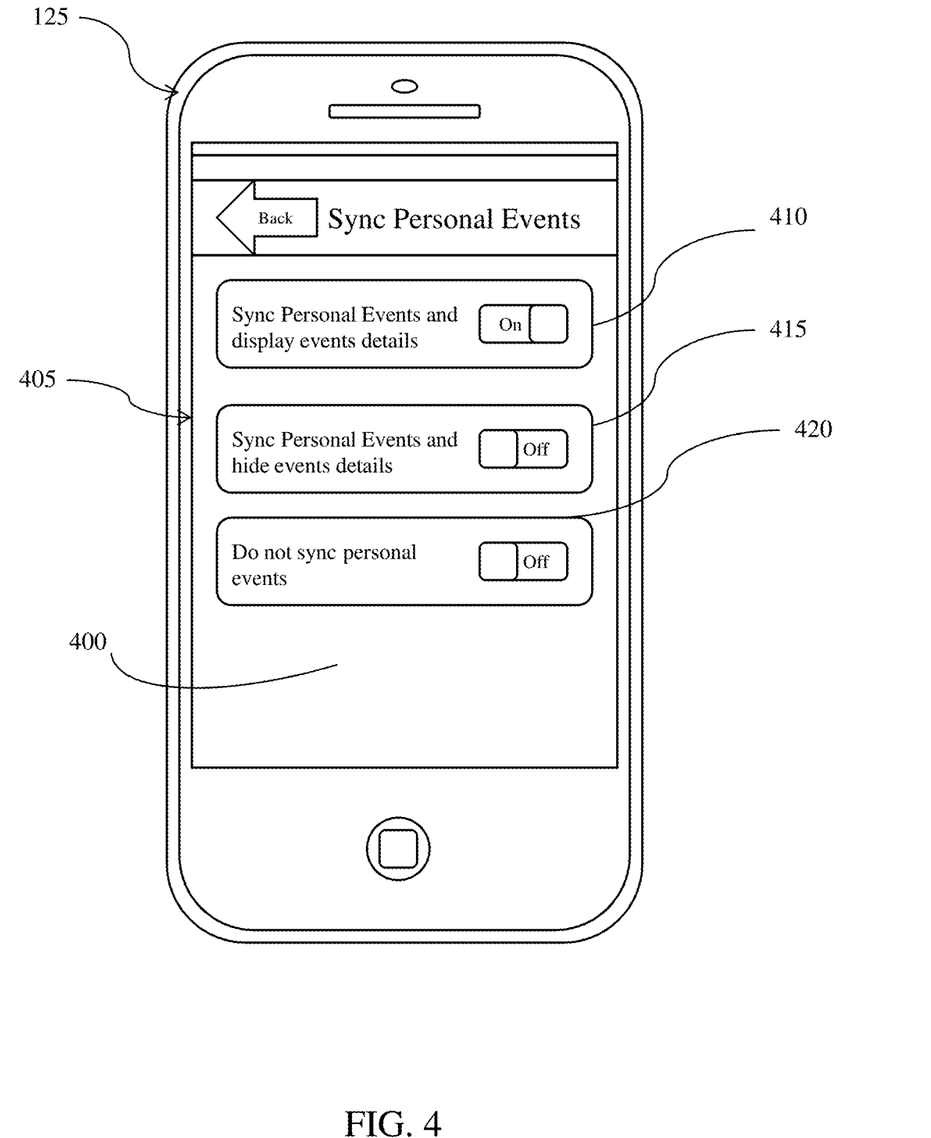
FIG. 4 illustrates an example of a user interface for selecting one or more sync settings.

Referring to FIG. 4, an example of a user interface 400 of the computing device 125 showing a plurality of sync settings 405 is shown. Through this user interface 400, a user of the device 125 can make selections relating to the syncing of personal information with a secure application 230, such as personal calendar information with a secure calendar application 245. These sync settings 405 can be enforceable against the personal calendar information or other relevant information. Through a first sync setting 410, a user can elect to have personal calendar information imported into the secure calendar application 245, and the calendar information can include temporal data and event details. For example, the temporal data can include the time and date of the event. As another example, the temporal data can also include the expected duration of the event, including whether the event is to be repeated in the future. The term "temporal data" is defined as data that is related to the timing of an event or calendar entry but does not include details that provide an indication as to the nature of the event or the calendar entry. The event details can include information that describes the event beyond simple timing data. For example, the event details may include a title that the user has assigned to the event and the reason for the event. The term "event details" is defined as data that extends beyond mere timing of an event or calendar entry and provides at least some indication as to the nature of the event or calendar entry.

Because there are some event details that a user may consider to be sensitive information, a second sync setting 415 can be selected to control the importation of the personal calendar information. For example, the second sync setting 415 may allow the importation of fields related to the temporal data of the event, but it may prevent the fields associated with the event details from being imported into the secure calendar application 245. Accordingly, the time/date and duration of the event may become evident in the secure calendar application 245, but the event details may not be so viewable or accessible. A third sync setting 420 may be selected if the user wishes to have no personal calendar information from the non-secure calendar application 250 imported into the secure calendar application.

Depending on which sync setting is selected, the secure calendar application 245, through one or more of the system frameworks 215, may selectively access or retrieve the calendar information from the non-secure calendar application 250. For example, if the first sync setting 410 has been selected, the retrieved calendar information can include temporal information and event details. Based on this sync setting, the calendar information may involve the information related to all the fields (e.g., title, date, duration, participants, event description, etc.) of one or more calendar entries in the non-secure calendar application 250. Of course, the first sync setting 410 may not require all importation of all the fields of the entry from the non-secure calendar application 450, but the first sync setting 410 should include event details and/or a title that may explain the circumstances of the event in the non-secure calendar application 250.

Such information, however, may involve sensitive matters, like a medical appointment or marital counseling, for example. In such cases, the user of the non-secure calendar application 250 may not wish to have this information shared with employees of his company or others who may have access to enterprise data through the secure calendar application 245 or some other program. Accordingly, the user may select the second sync setting 415, which may permit the importation of temporal data but block the retrieval of event details. For example, based on this selection, the secure calendar application 245 may only retrieve the time and date of one or more events that are part the non-secure calendar application 250 and may not access any event details. In another arrangement, the event details may be retrieved from the non-secure calendar application 250, but the user may be provided with an opportunity to block their publication in the secure calendar application 245. For example, a notification can be displayed asking the user if he approves the publication of the retrieved information in the secure calendar application 245. In either case, the user may control the personal details that are to be published in the secure calendar application 245.

For the third sync setting 420, no information will be retrieved and imported into the secure calendar application 245. Although this setting may cover all events in the non-secure calendar application 250 in a blanket fashion, it may be applicable to only certain events. For example, an event in the non-secure calendar application 250 may arranged such that it has a designation that sets its sensitivity, at least based on the user's tastes. As a specific example, the user may determine that any medical appointment may not be shared with the secure calendar application 245, while an appointment associated with a volunteer organization may be so shared. This feature may also apply to the first sync setting 410 and the second sync setting 415. Accordingly, a range of designations that specify which types of appointments or groups of appointments on a non-secure calendar application 250 and how much information relating to such appointments is to be shared with the secure calendar application 245 may be provided to a user.

In either case, the relevant calendar information may be imported from the non-secure calendar application 250 into the secure calendar application 245. In addition, the relevant calendar information may be displayed as part of the secure calendar application 245, such as when the secure calendar application 245 is activated. For example, referring to FIG. 5, there are three exemplary user interfaces 505, 510, 515 of the secure calendar application 245 of the computing device 125. These interfaces 505, 510, 515 may be related to the first sync setting 410, the setting in which at least some event details may be imported into the secure calendar application 245.

Figure 5:
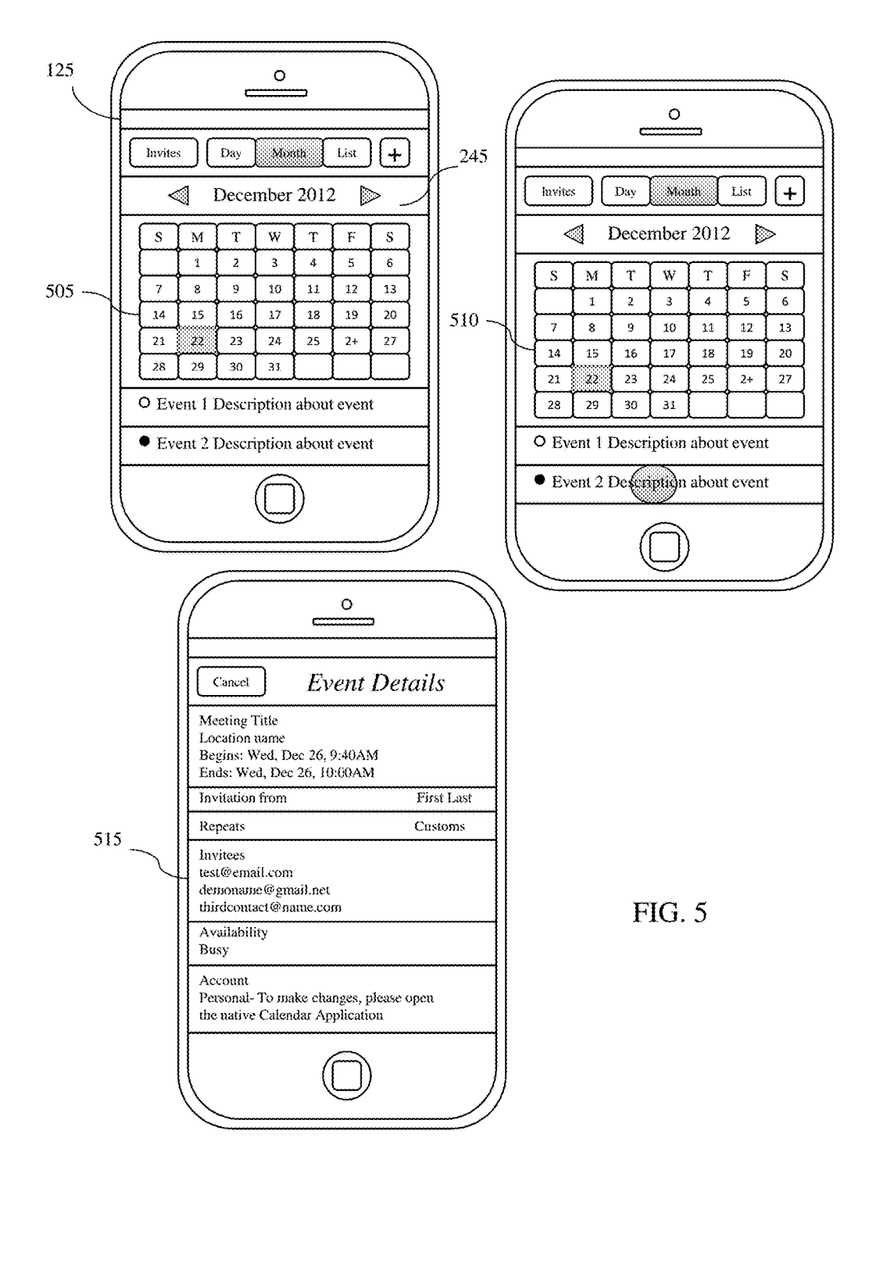
FIG. 5 illustrates examples of user interfaces that are associated with a first sync setting.

As can be seen in user interface 505, the secure calendar application 245 shows a number of exemplary events, including Event 1 and Event 2, for the month of December in 2012. Event 1 may be a calendar entry that is organic to the secure calendar application 245, meaning that a user scheduled the event directly through the secure calendar application 245 or some other secure application linked in some way to the secure calendar application 245. Event 2 may be an event that has been imported from the non-secure calendar application 250. As an example, these personal imported events may be hi-lighted or otherwise marked to distinguish them from the events that are organic to the secure calendar application 245, such as being shaded in this case.

In this example, because the first sync setting 410 has been previously selected, event details of Event 2 may be displayed. For example, in user interface 505, a short description of what Event 2 concerns may be shown. In user interface 510, the user may select the entry related to Event 2, and additional details may be shown, such as those pictured in user interface 515. These details may include the title, time, location, the invitees, whether the event is to be repeated, the source of the event, the user's availability, a detailed description of the event, etc. Because this entry is part of a secure calendar application 245, other users who have permission to access this particular user's secure calendar entries may be able to access and view this personal information, in addition to the user of the computing device 125.

Figure 6:
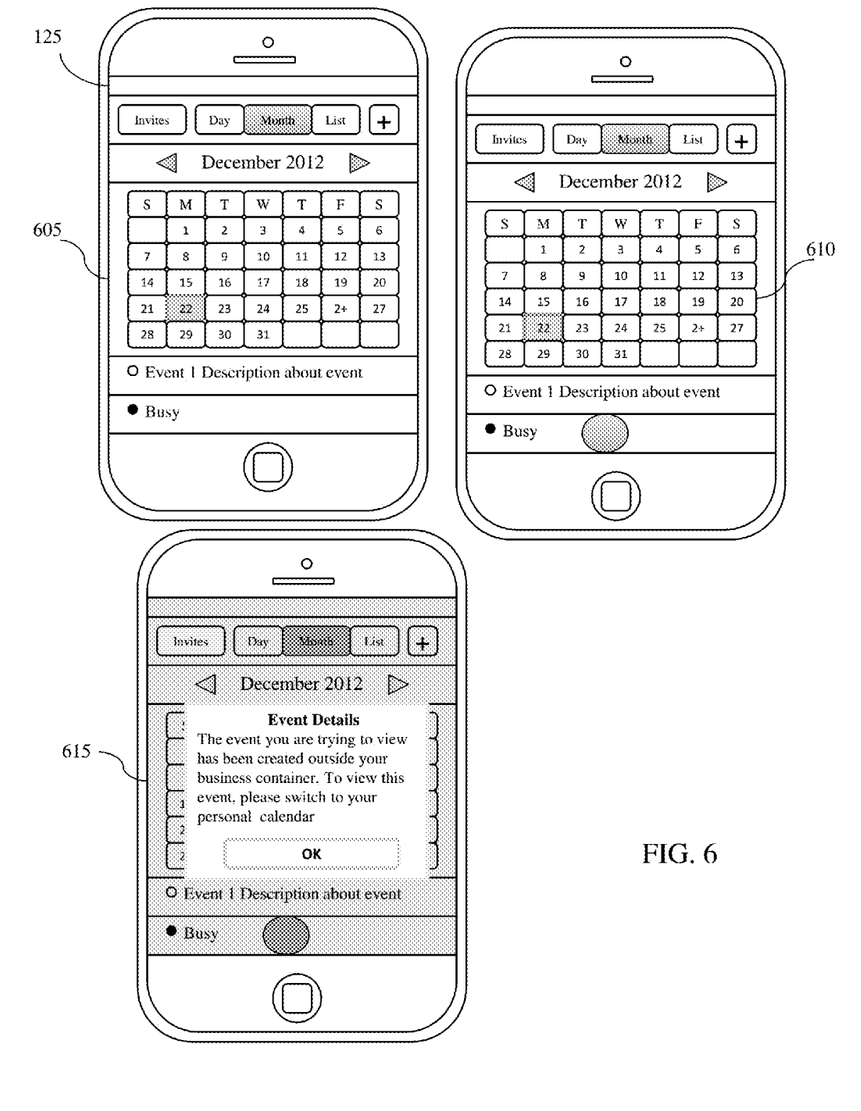
FIG. 6 illustrates examples of user interfaces that are associated with a second sync setting.

Referring to FIG. 6, there are several other exemplary user interfaces 605, 610, 615 of the secure calendar application 245 of the computing device 125. These interfaces 605, 610, 615 may be related to the second sync setting 415, the setting in which at least some event details are prevented from being displayed as part of the secure calendar application 245. In user interface 605, the time and date of the imported personal event, Event 2, may be shown, along with the event being marked by shading or some other suitable indicator. Other details, however, such as the title and the short description may not be displayed. In fact, any detail that may provide a person or machine with information as to the nature of an event, as opposed simply to its date and time, may be prevented from being displayed in view of the second sync setting 415. In one example, the availability of the user for the obfuscated personal event may be displayed, which can be seen by the users and others accessing the user's schedule that is part of the secure calendar application 245. In another example, the user's availability may be simply listed as "busy" or "unavailable" by default, although the user may be provided with an opportunity to determine this setting, as well.

In contrast to the interfaces described in FIG. 5, if Event 2 is selected in interface 610, the user or other selectee may not be provided with the event details of Event 2. Instead, the selectee may be provided with a notification informing such a person that the event was created outside the secure calendar application 245 and should be viewed in the relevant non-secure calendar application 250 or other program. Accordingly, the user's availability may be integrated into the secure calendar application 245, but details that the user does not wish to become part of his employer's secure calendar may be kept hidden.

There are several ways to control the display of the personal calendar information in the secure calendar application 245 in accordance with the principles described above. For example, based on which sync setting is selected, only the information from a certain number of fields associated with the non-secure calendar application 250 may be accessed and imported into the secure calendar application 245. Alternatively, the information related to all or a greater number of fields may be accessed, but only a certain portion of this information may be imported into the secure calendar application 245. In yet another arrangement, the additional information may be accessed/retrieved and imported but only certain portions of it may be displayed as part of the secure calendar application 245. In other words, filtering through which information is to be screened from the secure calendar application 245 based on the sync setting can be performed at any point in the step of obtaining the information and displaying it as part of the secure calendar application 245.

Whether the first sync setting 410 or the second sync setting 415 is selected, the user's personal schedule may be accessed and imported into a secure calendar to ensure a more efficient calendaring process. As such, if an associate of an enterprise, who has access to the user's secure calendar, attempts to schedule an event, the associate may have a clearer picture of the user's agenda. In fact, this feature can be incorporated into a scheduling assistant, a program in which event data is provided (time, date, required attendees, location, etc.) and potential time periods that meet or comply with the provided data for the event are returned. Additional information is contained in U.S. Provisional Patent Application No. 61/898,646, filed on Nov. 1, 2013, which is herein incorporated by reference in its entirety.

In one arrangement, the process of syncing the calendar information from the non-secure calendar application 250 may be performed each time the secure calendar application 245 is activated. Such a feature can ensure that the secure calendar application 245 is kept up-to-date with the user's schedule. Of course, the secure calendar application 245 can be synced with such information in accordance with some other timeframe or event, including if the secure calendar application 245 is running in the background.

In some cases, the entries related to the personal calendar information in the secure calendar application 245 may be edited while the secure calendar application 245 is activated. This feature can apply irrespective of whether the first sync setting 410 or the second sync setting 415 (limited or no event details) has been selected. As such, a user may cancel or re-schedule the imported personal event while operating the secure calendar application 245 or perform virtually any other edit that is permitted.

In other cases, however, a user may not be permitted from performing such edits on the imported personal calendar information. As such, the user may not be allowed to cancel or re-schedule the event or perform any other operation, other than to view the details that have been permitted to be shown. If a user attempts to make such edits in the face of this restriction, a notification can be presented to the user instructing the user that such edits should be performed in the non-secure calendar application 250 (or other authorized program). This feature can prevent an enterprise or some other entity from accidentally or intentionally re-arranging a user's personal schedule.

The description here has presented several examples of sharing personal calendar information with a secure calendar application. Nevertheless, the description is not so limited. In particular, the concept of selectively sharing personal calendar information may apply to any type of enterprise application or to non-secure calendar applications. In fact, the process of sharing information may apply to any type and combination of non-secure applications and secure applications or any other type of applications in which it may be desired to at least partially restrict data sharing between the applications. For example, the same concepts described here may apply to a non-secure contacts application and a corresponding secure contacts application if a user wishes that certain details of personal contacts are kept hidden from a secure contacts listing.

One skilled in the art will appreciate that the processes described herein, particularly those of FIG. 3, may be under the direction of, facilitated by or at least assisted by one or more of the processing units 250 of FIG. 2. Other circuitry and hardware components of the computing device 125 may also provide such support.

While various embodiments have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

What is claimed is:

1. A method of selectively displaying calendar information on a secure calendar application that is loaded on a computing device, comprising:
   in an environment designed to restrict secure applications from processing requests from non-secure applications, by the computing device, selectively accessing calendar information from a non-secure calendar application in accordance with a sync setting that is enforceable against the calendar information;
   by the computing device, importing the calendar information from the non-secure calendar application into the secure calendar application, wherein the information is personal information that is associated with a user of the non-secure calendar application;
   by the computing device, displaying the imported calendar information as part of a user interface of the secure calendar application when the secure calendar application is activated, on a restricted basis such that some part of the personal information of the user is displayed as part of the secure calendar application and some part of the personal information is prevented from being displayed as part of the secure calendar application;
   by the computing device, permitting the imported calendar information to be edited when the imported calendar information is displayed as part of the secure calendar application;
   by the computing device, determining whether an appointment on the non-secure calendar application is a medical appointment;
   responsive to making a determination that the appointment is not a medical appointment, by the computing device, sharing the appointment with the secure calendar application; and
   responsive to making a determination that the appointment is a medical appointment, by the computing device, not sharing the appointment with the secure calendar application.

2. The method according to claim 1, wherein the imported calendar information shows details related to a personal schedule of the user.

3. The method according to claim 2, further comprising displaying enterprise calendar information that is organic to the secure calendar application.

4. The method according to claim 1, wherein selectively accessing the calendar information comprises accessing all fields of the calendar information for a particular event from the non-secure application such that all the fields of the calendar information for the particular event are imported and displayed as part of the secure calendar application.

5. The method according to claim 1, wherein selectively accessing the calendar information comprises accessing only certain fields of the calendar information for a particular event from the non-secure application such that only the certain fields of the calendar information are imported and displayed as part of the secure calendar application.

6. The method according to claim 5, wherein the certain fields are a date field and a time field.

7. The method according to claim 1, further comprising incorporating the imported calendar information into a scheduling assistant that provides an indication as to availability of the user for a particular time slot.

8. A method of selectively displaying information from a first non-secure calendar application as part of a first secure calendar application, comprising:
 in an environment designed to restrict secure applications from processing requests from non-secure applications, by a computing device, retrieving data from the first non-secure calendar application, wherein the data is personal data that is associated with a user of the first non-secure calendar application;
 by the computing device, displaying the retrieved data as part of the first secure calendar application on a restricted basis such that some part of the personal data that is associated with the user is displayed as part of the first secure calendar application and some part of the personal data is prevented from being displayed as part of the first secure calendar application;
 by the computing device, permitting the retrieved data to be edited when the retrieved data is displayed as part of the first secure calendar application:
 by the computing device, determining whether an appointment on the first non-secure calendar application is a medical appointment;
 by the computing device, responsive to determining that the appointment is not a medical appointment, sharing the appointment with the first secure calendar application; and
 by the computing device, responsive to determining that the appointment is a medical appointment, not sharing the appointment with the first secure calendar application.

9. The method according to claim 8, wherein the first secure calendar application corresponds to the first non-secure calendar application such that the first secure calendar application is a secure version of the first non-secure calendar application.

10. The method according to claim 8, wherein the part of the personal data that is displayed as part of the first secure calendar application relates to temporal information from an event that is scheduled in the non-secure calendar application and the part of the personal data that is prevented from being displayed as part of the first secure calendar application relates to information that describes the event that is scheduled in the non-secure calendar application.

11. A computing device that supports an environment designed to restrict secure applications from processing requests from non-secure applications, comprising:
 a display unit that is configured to display the secure applications and the non-secure applications, wherein one of the secure applications is a secure calendar application and one of the non-secure applications is a non-secure calendar application; and
 a processor that is configured to:
  cause the display unit to present:
   a first sync setting through which a user can elect to have temporal data and event details for calendar entries imported into the secure calendar application from the non-secure calendar application;
   a second sync setting through which the user can elect to have temporal data for calendar entries imported into the secure calendar application from the non-secure calendar application without importation of event details for calendar entries; and
   a third sync setting through which the user can elect not to import temporal data and event details for calendar entries into the secure calendar application from the non-secure calendar application;
  facilitate selective retrieval of calendar information from the non-secure calendar application;
  facilitate the importation of the retrieved calendar information from the non-secure calendar application into the secure calendar application;
  cause the display unit to display the imported calendar information as part of the secure calendar application when the secure calendar application is activated;
  cause the display unit to display other calendar information that is organic to the secure calendar application;
  permit the retrieved calendar information to be edited when the retrieved calendar information is displayed as part of the secure calendar application;
  determine whether an appointment on the non-secure calendar application is a medical appointment;
  responsive to determining that the appointment is not a medical appointment, share the appointment with the secure calendar application; and
  responsive to determining that the appointment is a medical appointment, not share the appointment with the secure calendar application.

12. The computing device according to claim 11,
wherein calendar entries of the non-secure calendar application have associated fields for temporal data and event details, and
wherein information from specific ones of the associated fields may be accessed and imported into the secure calendar application based on which of the first sync setting, the second sync setting, and the third sync setting is selected.

13. The computing device according to claim 11, wherein calendar entries of the non-secure calendar application have associated fields for temporal data and event details,
 wherein information related to the associated fields may be accessed, and
 wherein only a portion of said information may be imported into the secure calendar application.

14. The computing device according to claim 11, wherein calendar entries of the non-secure calendar application have associated fields for temporal data and event details,
 wherein information related to the associated fields may be imported into the secure calendar application, and
 wherein only a portion of said information may be displayed via the secure calendar application.

15. The computing device according to claim 11, wherein the processor is further configured to cause the display unit to present a notification asking the user if the user approves publication in the secure calendar application of information that has been retrieved from the non-secure calendar application, and     wherein the processor is further configured to cause the display unit to display a scheduling assistant and the scheduling assistant provides availability of the user based at least in part on the imported calendar information from the non-secure calendar application.

16. The computing device according to claim 11, wherein the processor is further configured to provide the user with a plurality of designations that specify types of appointments on the non-secure calendar application and how much information relating to the specified types of appointments is to be shared with the secured calendar application, and     wherein at least one of the designations designates medical appointments on the non-secured calendar application and prevents any medical appointments from being shared with the secured calendar application.

\* \* \* \* \*